United States Patent [19]

Williams

[11] Patent Number: 4,506,836
[45] Date of Patent: Mar. 26, 1985

[54] DUAL COVER AND FEED TUBE PROTECTOR ACTUATION APPARATUS FOR A FOOD PROCESSOR

[75] Inventor: James E. Williams, Stamford, Conn.

[73] Assignee: Cuisinarts Research & Development, Inc., Greenwich, Conn.

[21] Appl. No.: 451,620

[22] Filed: Dec. 20, 1982

[51] Int. Cl.³ .................. B02C 18/16; B02C 23/04
[52] U.S. Cl. .................................. 241/37.5; 241/92; 241/282.1
[58] Field of Search ............... 241/37.5, 92, 282.1, 241/282.2

[56] References Cited

U.S. PATENT DOCUMENTS

| 4,216,917 | 8/1980 | Clare et al. | 241/92 X |
| 4,371,118 | 2/1983 | Sontheimer et al. | 241/92 X |
| 4,396,159 | 8/1983 | Podell | 241/37.5 |

Primary Examiner—Howard N. Goldberg
Assistant Examiner—Timothy V. Eley
Attorney, Agent, or Firm—Parmelee, Bollinger & Bramblett

[57] ABSTRACT

Dual actuating apparatus is provided for a food processor of the type having a motor with a working bowl, a motor-driven member in the bowl for receiving rotatable tools and with a removable cover positioned on the bowl during the operation which carries a feed tube for feeding food items to be processed into the bowl. An expanded feed tube protector has an outer sleeve which is adapted to be nested over the feed tube and this sleeve is associated with a captivated, movable food pusher which is mounted for movement within the sleeve. In accordance with the present invention the cover and the outer sleeve of the feed tube protector each carry a portion of a dual actuator cam, a first portion of the cam being mounted on the cover while the second portion is mounted on the outer sleeve of the feed tube protector. Previously the cam for depressing the actuator rod of the food processor was a one-piece unit mounted and extending downward from the outer sleeve of the feed tube protector. The advantageous separation of the cam into two portions acting in dual relationship assures that the food processor is not operative unless the two portions of the cam are positioned together in cooperative action side-by-side on the bowl requiring the placement of both the cover and the feed tube protector in their proper positions on the working bowl before the food processor can be actuated.

8 Claims, 5 Drawing Figures

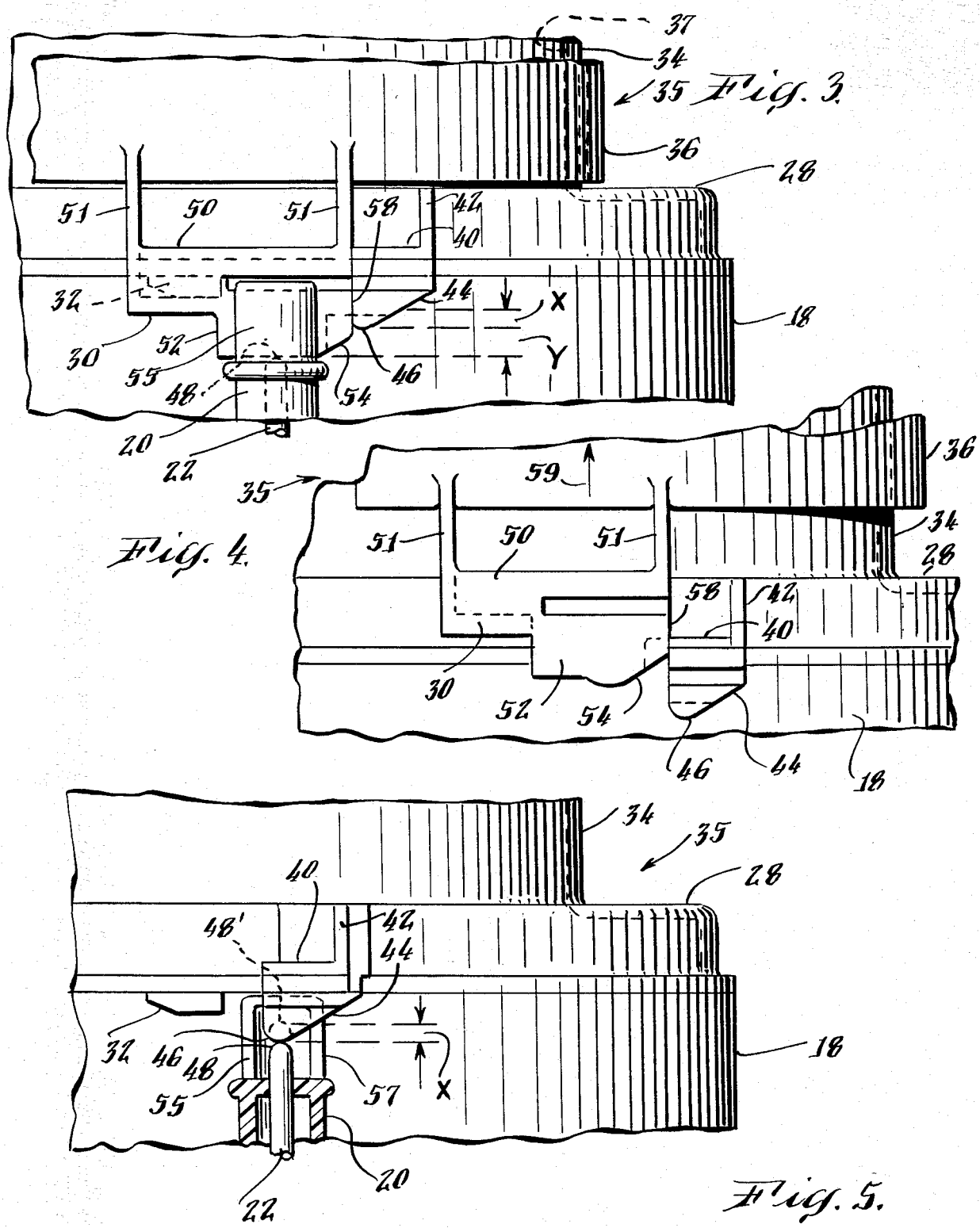

DUAL COVER AND FEED TUBE PROTECTOR ACTUATION APPARATUS FOR A FOOD PROCESSOR

BACKGROUND OF THE INVENTION

This invention relates to feed tube protectors for food processors, and more particularly to such a protector in which actuator means are provided on both the cover and feed tube protector such that both the feed tube protector and the cover must be properly installed together by the user in order to enable the operation of the food processor to occur for protecting both the user and the processor.

Food processors of the type to which the present invention is applicable have a working bowl with a motor-driven member projecting into the bowl with which various selected rotary food processing tools can be engaged to be driven for performing various food processing operations in accordance with the desires of the user. A detatchable cover is secured over the top of the bowl during use and the cover includes a feed tube having a mouth which opens downwardly through the cover into the top of the bowl. Food items to be processed are placed in the feed tube and then manually pushed down through the feed tube into the bowl by means of a food pusher which is adapted to slide down in the manner of a plunger through the feed tube.

A bowl cover safety feature is conventionally provided which requires that the cover be firmly locked on the bowl in normal operating position before the motor of the food processor will start. The cover which locks rotationally on the bowl is provided with a projection or actuator which causes the actuation of control means such as a switch carried by the housing only when the cover is properly locked in normal operating position on the bowl. In this arrangement, the motor cannot be energized before the cover is properly positioned on the bowl, but the size of the feed tube is restricted in terms of shape, cross-section and height to prevent an adult hand from being inadvertently inserted sufficiently far down in the feed tube as to come into contact with the rotating blade located in the upper portion of the working bowl.

In my U.S. Pat. No. 4,226,373 a feed tube protector is provided having an outer sleeve which carries an actuator for making the machine operative only when this sleeve is properly positioned over the feed tube. The sleeve also carries a captivated, movable food pusher which is mounted for movement within the sleeve and within the passageway in the feed tube. Accordingly, the feed tube can be expanded to any cross-sectional area and shape which is practicable, and when the outer sleeve of the feed tube protector is properly positioned on the feed tube, the actuator extending therefrom is operatively associated with a control means in the food processor to permit operation of the motor drive only when this expanded feed tube protector is properly nested around and positioned on the feed tube of the cover. If the cover were omitted, the actuator of the expanded feed tube protector might be engaged with the control means of the food processor, thereby enabling the processor to be operated without its cover, a very unlikely event, but nevertheless undesirable even though a remote situation.

SUMMARY

Accordingly, it is an object of this invention to provide a new and improved food processor having a feed tube protector which in combination with the cover prevents the operation of the food processor by the user unless the cover as well as the feed tube protector are both properly positioned. Namely, the protector is nested over the feed tube and the cover is properly installed on the working bowl for protecting the user as well as the machine.

A further object of this invention is to provide a new and improved food processor with a safety actuation means which must be manually operated by the user by employing both an expanded feed tube protector as well as the cover to enable the operation of the food processor only when the two are complementary positioned on the bowl together in their operative interrelationship to prevent inadvertent injury either to the user or to the food processor.

In carrying out this invention in one illustrative embodiment thereof, a food processor of the type including a housing is provided containing an electric motor drive and control means for rendering the electric motor drive inoperative unless the control means is actuated. A bowl is mountable on the housing having a drivable member in the bowl with which various selected rotary tools can be engaged to be driven. A removable cover is provided for the bowl having a feed tube mounted on the cover which forms a passageway for feeding food items through the cover into the bowl. A feed tube protector is provided having an outer sleeve removably nestable over the feed tube in a proper position thereon. Cooperating complementary dual actuator means are provided on both said outer sleeve and on said removable cover. Said actuator means are located on the outer sleeve of the protector and on the removable cover in predetermined positions for causing actuation of the control means only when the outer sleeve is properly nested around the feed tube and the cover is properly positioned on the bowl. The first actuator means on the cover initiates engagement with the control means and this actuation is completed by the second actuator means on the outer sleeve of the feed tube protector.

It is among the many advantages of a food processor embodying this invention that the control means cannot be actuated by either the cover or by the feed tube protector individually but requires that both be used together in complementary fashion in order that the control means of the food processor is thereby actuated for enabling operation of the machine. This dual complementary arrangement assures that both the cover as well as the expanded feed tube protector be properly mounted on a bowl which is itself properly mounted before the food processor can be used.

BRIEF DESCRIPTION OF THE DRAWINGS

The invention, together with further aspects, features, objects and advantages thereof will be more clearly understood from a consideration of the following description in conjunction with the accompanying drawings in which like reference numerals are used to refer to corresponding elements throughout the various views.

FIG. 3 is an enlarged, partial elevational view of the food processor of FIGS. 1 and 2, illustrating the cover and expanded feed tube protector properly positioned on the bowl with the complementary dual actuator means fully engaging and rendering operative the control means of the food processor.

FIG. 4 is a view similar to FIG. 3 illustrating the actuator means on the expanded feed tube protector being mis-aligned and out of position thereby preventing the actuation of the control means.

FIG. 5 is a view similar to FIGS. 3 and 4 illustrating the engagement of the actuator means on the cover with the control means, showing that the cover by itself, even though properly positioned on the bowl, cannot alone actuate the control means.

DESCRIPTION OF THE PREFERRED EMBODIMENTS

This invention constitutes an improvement over my U.S. Pat. No. 4,226,373 entitled "FEED TUBE PROTECTOR FOR A FOOD PROCESSOR". Accordingly, the feed tube protector and the apparatus described and claimed in that patent will not be described in detail hereinafter. Only those aspects will be referred to which will be helpful to the reader in understanding the present invention.

Figure 1:
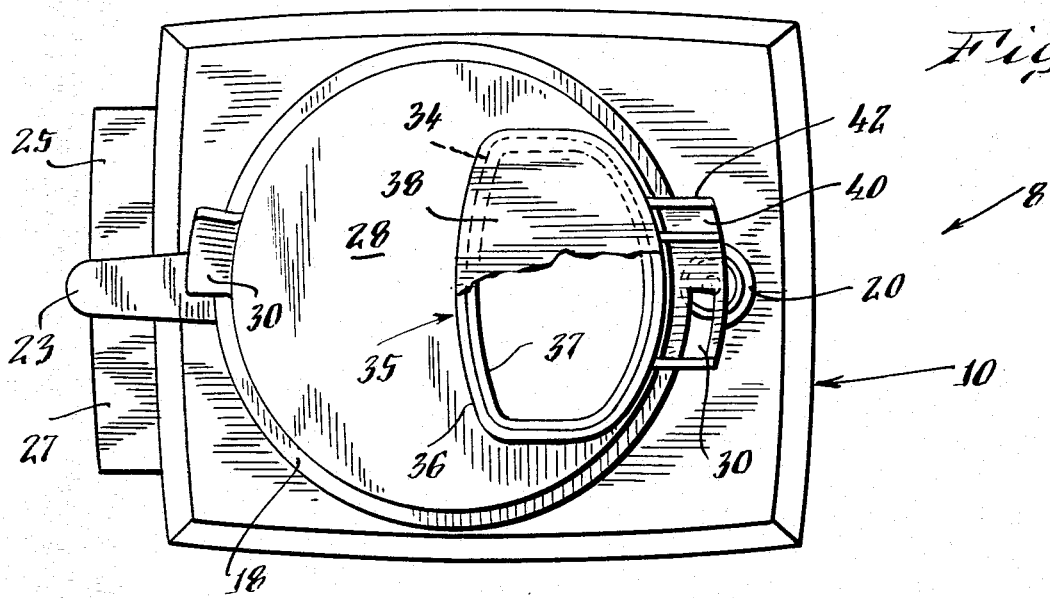
FIG. 1 is a top view of a food processor embodying the invention.
Figure 2:
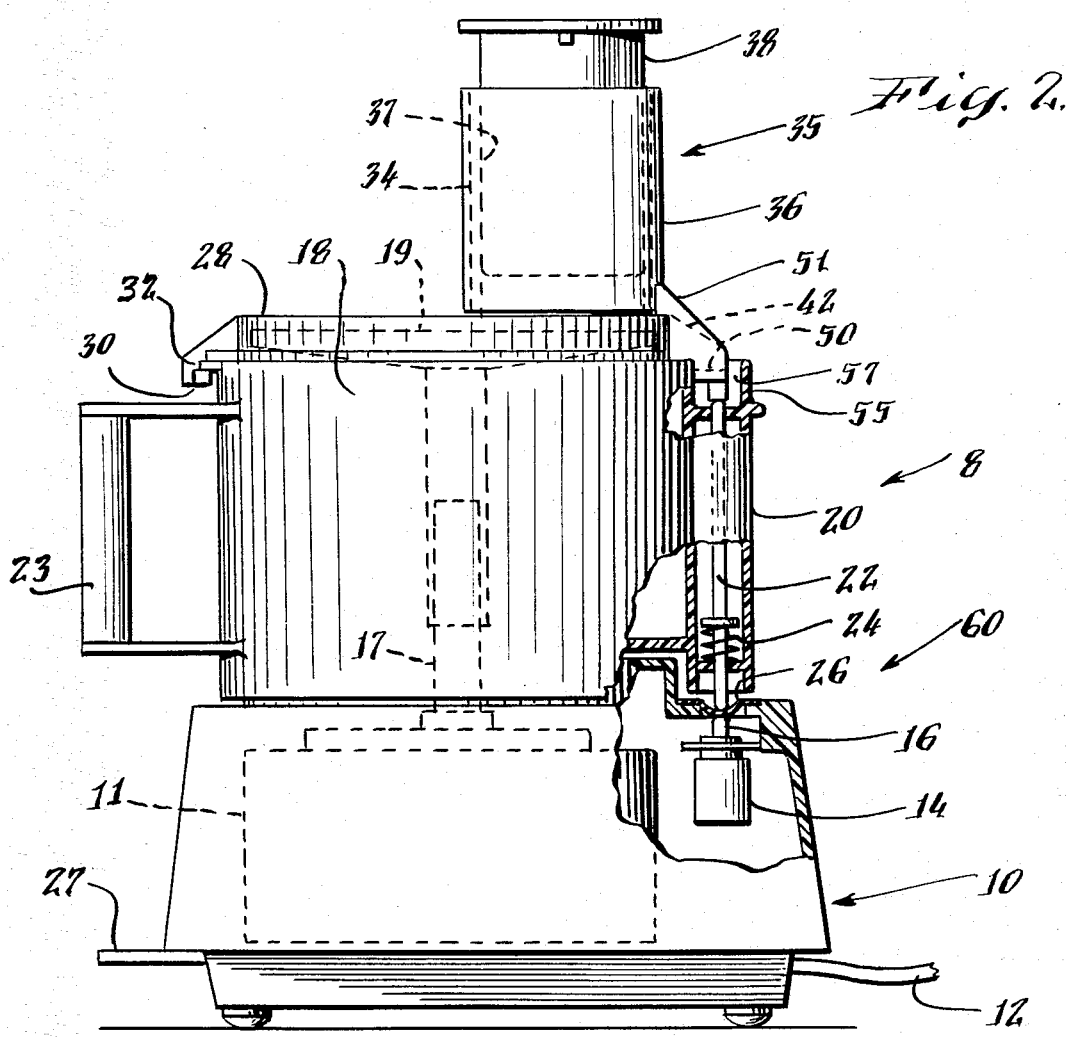
FIG. 2 is a side elevational view of the food processor of FIG. 1, a portion of which is broken away to illustrate internal construction features thereof.

Referring now to FIGS. 1 and 2, a food processor 8 is illustrated having a base housing 10 containing a motive source in the form of a relatively powerful electric motor drive 11 which is energized by a power cord 12 via a switch 14 having a vertically movable actuating button 16. A vertical drive shaft 17 extends upwardly from the base housing 10 into a working bowl 18 which is mountable on the housing 10 surrounding the drive shaft 17. A variety of different types of food processing tools, one of which is illustrated at 19 in FIG. 2, are provided which may be selectively mounted on the drive shaft 17 for rotation therewith within the bowl 18.

Switch-actuating levers 25, 27 are provided on the front of the machine 8 for enabling the user to press these levers for turning the food processor on or off or to operate it in the pulse mode, i.e., with a brief pulse of driving power, which can be repeated by the user as may be desired.

A vertical semi-cylindrical boss 20 formed on the side of the bowl 18 defines a guideway in which is carried a vertically movable operating rod 22 which is normally urged upwardly by means of a spring 24. When the bowl 18 is properly positioned on the housing 10, the operating rod 22 is aligned with the actuating button 16 of the switch 14 being separated therefrom by means of a flexible, liquid-tight membrane 26.

A handle 23 is provided on the bowl 18 opposite the boss 20. Alternatively, if desired, the handle can be mounted on or near this boss 20. The top of the bowl 18 is closed by a cover 28 which is arranged to be secured on the bowl in locked relationship in its normal operating position on the bowl whenever the food processor is in operation. The cover may be secured in locked engagement with the bowl by placing the cover on the rim of the bowl and turning the cover to obtain a twist-lock effect.

One way of obtaining such locking engagement as illustrated in FIG. 2 is to provide the cover with one or more depending lugs 30, which upon rotation of the cover 28 engage beneath a plurality of cooperating radial ledges 32 on the bowl 18 near its rim. One such depending lug 30 is provided on a feed tube protector 35, to be described, for locking it in place on the bowl together with the cover.

Extending upward from the cover 28 is a feed tube 34 which defines a passageway 37 therethrough extending downwardly through the cover into the bowl. An expanded feed tube protector, referred to generally by the reference numeral 35, which is described in the patent referred to above is positioned on the feed tube 34 and has an outer sleeve 36 carrying a captivated, telescoping food pusher 38 therein. This outer sleeve 36 nests down around the feed tube 34 as shown in FIGS. 2 and 3.

In order to mount the expanded feed tube protector 35 on the cover 28 and the cover on the bowl 18 for actuating the push rod 22, the cover is provided with a flange 40 having a stiffening rib 42. As shown in FIGS. 3-5, a front guide cam 44 extends downwardly from this flange 40. This front cam 44 is rounded at its lower rear corner at 46 so that the cover will rotate freely, when the cover is being removed from the bowl and this corner 46 contacts the upper end 48 of the push rod 22. In other words, this slight rounding of the cam corner 46 prevents this front cam 44 from jamming against the push rod top 48 as the cover 18 is being rotated for unlocking it from the bowl.

Likewise, the outer sleeve 36 of the expanded feed tube protector 35 carries a horizontal flange 50 along one side thereof which is shown as being at a lower elevation than the lower end of the outer sleeve and which is provided with additional support by a pair of upwardly extending stiffening ribs 51. Extending downwardly from the underside of the sleeve flange 50 is an actuator 52 having a leading, upwardly sloping, second cam surface 54 which is complementary with respect to the front cam 44. In effect, this second cam 54 completes a dual continuous cam surface comprising the first cam surface 44 and the second cam surface 54. This cooperative action of dual cam surfaces 44 and 54 might also be referred to as a split surface or a split cam structure.

The upper end of the boss 20 is shown as including an enclosing portion 55 which surrounds or encloses the upper end 48 of the push rod 22. There is an access slot 57 (FIG. 2) in this enclosing portion 55 of the boss 20 for admitting the first and second cams 44, 54.

As will be noted in FIG. 5, the first cam surface 44 may be considered as acting as a prepositioner for the push rod 22. When the cover is secured onto the bowl by twist locking the cover on top of the bowl, this first cam 44 enters the opening in the boss 20 and contacts or engages the push rod top 48 initially partially depressing the push rod 22 by an amount indicated in FIG. 5 by the letter "X". The X distance is insufficient to actuate the control means 60 of the food processor. Namely, this initial displacement X is not enough to bring the bottom of the push rod 22 into contact with and fully depress the push button 16 sufficient to close the switch 14.

However, as is indicated in FIG. 3, the first cam surface 44 leads the way for the second cam surface 54, which then moves the push rod 22 fully downwardly the final distance "Y" as indicated in FIG. 3 for actuating the switch 14. The top 48 of the push rod 22 is completely engaged by the bottom of the actuator 52 when the two cam surfaces have cooperated to fully depress the push rod 22 as shown in FIG. 3.

In operation the feed tube protector 35 is positioned on the cover 28 with the horizontal flanges 40 and 50 being juxtaposed in abutting aligned relationship such that first cam 44 and second cam 54 are cooperatively acting for effectively presenting a single continuous split cam surface. The cover 28 is placed on the rim of the bowl 18 and is rotated for locking it in place by causing the depending lug 30 on the cover 28 and a similar lug 30 on the flange 50 to engage under the cooperating radial ledges 32 on the bowl to obtain the twist-lock effect described before. As this twist locking operation takes place, first cam surface 44 begins depressing the push rod 22 by the distance X, and continued depression through the distance Y is provided by the second cam surface 54 on the annular flange 50.

Since the cover is now secured in locked relationship on the bowl, the push rod 22 is now held fully depressed in an actuated position as shown in FIG. 2. It will be understood that the other control switches or buttons 25, 27 may now be utilized for turning on the electric power to the motor drive mechanism when the cover and feed tube protector have been properly positioned for safe operation as described and shown.

It should be noted that unless the expanded feed tube protector 35 as well as the cover 28 are both in proper position on the bowl 18 as is illustrated in FIG. 3 the push rod 22 is not actuated and therefore the control means for the food processor is not operative.

As is indicated in FIG. 5, if only the cover is placed properly on the bowl the distance X which the push rod 22 is depressed is not sufficient to actuate the control means of the machine. On the other hand, as will be understood from FIG. 3, if only the expanded feed tube protector 35 is placed on the bowl, (without the cover 28) then the cam surface 54 alone will not be in a position to contact the top end 48 of the push rod 22, because the front edge 58 of this cam 54 will abut against the side (not the top 48) of the push rod. Thus, this vertical cam edge 58 will abut the push rod from the side, and the second cam 54 will be incapable of depressing the rod 22.

As is evident from FIG. 4, if the outer sleeve 36 of the feed tube protector is relatively elevated in mis-alignment in accordance with the direction of the arrow 59 then its second cam surface 54 will fail to contact and depress the push rod 22 to activate the food processor. FIG. 4 shows that the feed tube protector sleeve 36 is not fully nested down around the feed tube 34.

Accordingly, providing cooperating complementary dual cam surfaces on both the cover and the outer sleeve of the expanded feed tube protector insures that both the cover and the expanded feed tube protector must be properly positioned relative to each other and to the bowl before the control means of the food processor can be actuated. Actuation cannot take place unless the feed tube protector is properly positioned on the feed tube and that the cover is properly positioned on the bowl. The cover nor the feed tube protector can individually actuate the control mechanism of the food processor. This cooperating split cam structure is easy to operate and prevents the inadvertent operation of the food processor by using the expanded feed tube protector alone. This safety feature is provided without greatly modifying present configurations of the food processors or negating the advantageous results achieved by the expanded feed tube protector as disclosed in my aforesaid patent.

It is to be understood that the control means 60 (FIG. 2) for rendering the motor drive 11 operative includes the movable rod 22. Unless the bowl 18 is mounted on the housing 10 in proper position, this rod 22 will not be aligned with the switch button 16 for activating the switch 14. When the control means 60 is fully actuated by the initial displacement X (FIG. 3) plus the final displacement Y the drive 11 is rendered operative and can rotate the member 17 for rotating the tool 19 when the operator moves a control lever 25 or 27 into an "ON" or a "PULSE" position.

The drive 11 can be rendered operative in any one of various ways when the control means 60 is fully actuated. For example, the electric motor in the drive 11 can be connected to the switch 14 so that the motor itself cannot be energized unless this switch is closed. Another example of a way to render the drive 11 operative is to interpose an electrically-actuated coupling, such as a clutch, between the electric motor and the tool driving member 17. This electrically-actuated coupling is then connected to the switch 14 so that the tool driving member 17 will not be rotated by the motor unless this switch is closed for energizing the coupling.

Since other changes and modifications varied to fit particular operating requirements and environments will be apparent to those skilled in the art, the invention is not considered limited to the example chosen for purposes of illustration, and includes all changes and modifications which do not constitute a departure from the true spirit and scope of this invention as claimed in the following claims and reasonable equivalents to the claimed elements.

What is claimed is:

1. For use in a food processor of the type including a housing containing an electric motor drive and control means for rendering said electric motor drive inoperative unless said control means are actuated by a predetermined full amount, a bowl mountable on said housing in a proper position thereon, with a driveable member in the bowl with which various selected rotary tools can be engaged to be driven by said motor drive, a removable cover for said bowl adapted to be properly positioned on said bowl, a feed tube on said cover forming a food passageway for feeding food items through said cover into said bowl, and a feed tube protector adapted to be properly related with the feed tube for preventing inadvertent access to the food passageway when the drive is operative, dual actuation apparatus for said control means of the food processor comprising:
   a first actuator on said cover for producing an initial portion of the predetermined full actuation of said control means,
   a second actuator on said feed tube protector for providing a final portion of the predetermined full actuation of said control means, and
   said first and second actuators being operatively associated in complementary relationship when the feed tube protector is properly related with the feed tube and the cover is properly positioned on the bowl properly mounted on the housing for providing both initial and final portions of full actuations of the control means for rendering the drive operative.

2. For use in a food processor of the type including a housing containing an electric motor drive and control means for rendering said electric motor drive inoperative unless said control means are actuated, a bowl mountable on said housing with a driveable member in the bowl with which various selected rotary tools can be engaged to be driven by said motor drive, a removable cover for said bowl adapted to be moved to proper operating position on said bowl, a feed tube on said cover forming a food passageway for feeding food items through said cover into said bowl, and feed tube protector adapted to be properly related with the feed tube for preventing inadvertent access to the food passageway when the drive is operative, for said control means of the food processor, dual actuation apparatus comprising:

first actuating means on said cover for partially but incompletely actuating said control means when said cover is being moved toward proper operating position on said bowl properly mounted on said housing, second actuating means on said feed tube protector apparatus, said second actuating means being placed immediately adjacent to said first actuating means in complementary relationship therewith when said feed tube protector is properly related with said feed tube, and said second actuating means completing the actuation of said control means for rendering said motor drive operative when said cover is fully moved into its proper operating position on the properly mounted bowl whereby the placement of said second actuating means on the feed tube protector apparatus immediately adjacent to said first actuating means on the cover in complementary relationship therewith and the movement of the cover into its proper operating position on the bowl properly mounted in the housing are all required in order to fully actuate the control means for rendering the drive operative.

3. For use in a food processor of the type including a housing containing an electric motor drive and control means for rendering said electric motor drive inoperative unless said control means are actuated, a bowl mountable on said housing with a driveable member in the bowl with which various selected rotary tools can be engaged to be driven by said motor drive, a removable cover for said bowl adapted to be moved to proper operating position on said bowl, a feed tube on said cover forming a food passageway for feeding food items through said cover into said bowl, and feed tube protector adapted to be properly positioned with the feed tube for preventing inadvertent access to the food passageway when the drive is operative, for said control means of the food processor, dual actuation apparatus comprising:

first actuating means on said cover for partially but incompletely actuating said control means when said cover is being moved toward proper operating position on said bowl properly mounted on said housing, second actuating means on said feed tube protector apparatus, said second actuating means being placed immediately adjacent to said first actuating means in complementary relationship therewith when said feed tube protector is properly related with said feed tube, said second actuating means completing the actuation of said control means for rendering said motor drive operative when said cover is fully moved into its proper operating position on the properly mounted bowl, whereby the placement of said second actuating means on the feed tube protector apparatus immediately adjacent to said first actuating means on the cover in complementary relationship therewith and the movement of the cover into its proper operating position on the bowl properly mounted in the housing are all required in order to fully actuate the control means for rendering the drive operative, said first actuating means on the cover includes a first cam surface, said second actuating means on the feed tube protector apparatus includes a second cam surface, and said second cam surface is complementary to said first cam surface for effectively combining with said first cam surface forming a combined cam surface when the feed tube protector apparatus is properly related with the feed tube, whereby said first cam surface produces an initial but incomplete actuation of said control means and said second cam surface complete the actuation of said control means as the cover is moved into its proper operating position on the bowl.

4. For use in a food processor, dual actuation apparatus for the control means of the food processor as claimed in claim 3, in which:

said second actuating means has a leading end portion extending at an abrupt angle to said second cam surface, and said second actuating means by itself is unable to actuate said control means, because said leading end portion alone is incapable of producing the initial actuation of said control means for bringing said control means into engagement with said second cam surface.

5. For use in a food processor of the type including a housing containing an electric motor drive and control means for rendering said electric motor drive inoperative unless said control means are actuated, a bowl mountable on said housing with a driveable member in the bowl with which various selected rotary tools can be engaged to be driven by said motor drive, a removable cover for said bowl adapted to be moved to proper operating position on said bowl, a feed tube on said cover forming a food passageway for feeding food items through said cover into said bowl, and feed tube protector adapted to be properly related with the feed tube for preventing inadvertent access to the food passageway when the drive is operative, for said control means of the food processor, dual actuation apparatus comprising:

first actuating means on said cover for partially but incompletely actuating said control means when said cover is being moved toward proper operating position on said bowl properly mounted on said housing, second actuating means on said feed tube protector apparatus, said second actuating means being placed immediately adjacent to said first actuating means in complementary relationship therewith when said feed tube protector is properly related with said feed tube, said second actuating means completing the actuation of said control means for rendering said motor drive operative when said cover is fully moved into its proper operating position on the properly mounted bowl, whereby the placement of said second actuating means on the feed tube protector apparatus immediately adjacent to said first actuating means on the cover in complementary relationship therewith and the movement of the cover into its proper operating position on the bowl properly mounted in the housing are all required in order to fully actuate the control means for rendering the drive operative, said control means includes a movable member, spring means urges said movable member in a first direction, said first actuating means on the cover includes a first cam surface, said second actuating means on the feed tube protector apparatus includes a second cam surface, said second cam surface effectively combines with said first cam surface to form a combined cam surface when said second actuating means is placed immediately adjacent to said first actuating means in complementary relationship therewith, said first cam surface produces an initial displacement of said movable member in a second direction against the force of said spring means, and said second cam surface produces a final full displacement of said movable member in said second direction against the force of said spring means for actuating the control means for rendering the drive operative.

6. For use in a food processor, dual actuation apparatus for the control means of the food processor as claimed in claim 5, in which:

said second actuating means has a leading end portion extending at an abrupt angle to said second cam surface, said first actuating means is normally immediately adjacent to said leading end portion for covering said leading end portion when said first and second actuating means are in complementary relationship, and said first cam surface produces sufficient initial displacement of said movable member in the second direction for enabling said second cam surface to engage said movable member for providing said final full displacement thereof.

7. For use in a food processor, dual actuation apparatus for the control means of the food processor as claimed in claim 6, in which:

said second actuating means by itself is unable to produce said final full displacement of said movable member, because in the absence of said first actuating means said leading end portion of said second actuating means abuts against said movable member without producing the initial displacement of said movable member.

8. For use in a food processor of the type including a housing containing an electric motor drive and control means for rendering said electric motor drive inoperative unless said control means are actuated by a predetermined full amount, a bowl mountable on said housing in a proper position thereon, with a driveable member in the bowl with which various selected rotary tools can be engaged to be driven by said motor drive, a removable cover for said bowl adapted to be properly positioned on said bowl, a feed tube on said cover forming a food passageway for feeding food items through said cover into said bowl, and a feed tube protector adapted to be properly related with the feed tube for preventing inadvertent access to the food passageway when the drive is operative, dual actuation apparatus for said control means of the food processor comprising:

a first actuator on said cover for producing an initial portion of the predetermined full actuation of said control means, a second actuator on said feed tube protector for providing a final portion of the predetermined full actuation of said control means, said first and second actuators being operatively associated in complementary relationship when the feed tube protector is properly related with the feed tube and the cover is properly positioned on the bowl properly mounted on the housing for providing both initial and final portions of full actuations of the control means for rendering the drive operative, said first and second actuators being operatively associated in complementary relationship when the feed tube protector is properly related with the feed tube and the cover is properly positioned on the bowl properly mounted on the housing for providing both initial and final portions of full actuations of the control means for rendering the drive operative, said first actuator is a first cam having a first cam surface, said second actuator is a second cam having a second cam surface, said second cam surface effectively combining with said first cam surface forming a combined cam surface when the feed tube protector is properly related with the feed tube, and either of said cams alone is incapable of producing both the initial and final portions of the full actuation of the control means for rendering the motor drive operative.

* * * * *